2 Sheets--Sheet 1.

M. BLAKEY.
Machines for Making Welded Tubing.

No. 148,406. Patented March 10, 1874.

Witnesses.
E. H. Bates
Chas. B. Stule

Inventor.
Mildred Blakey
Chipman Foster & Co.
Attys

2 Sheets--Sheet 2.
M. BLAKEY.
Machines for Making Welded Tubing.
No. 148,406. Patented March 10, 1874.
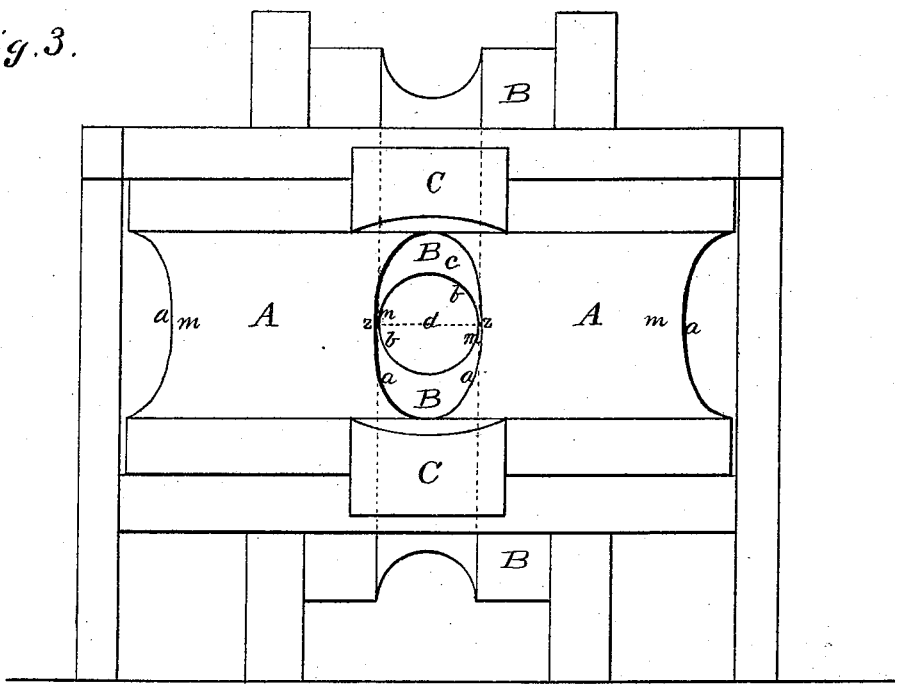
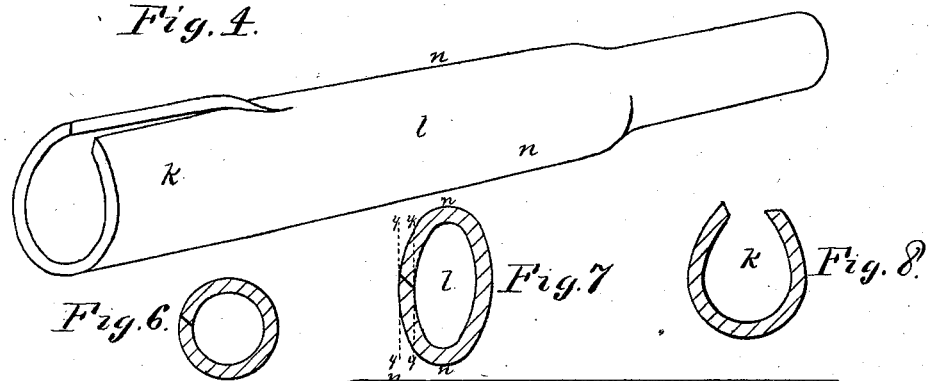
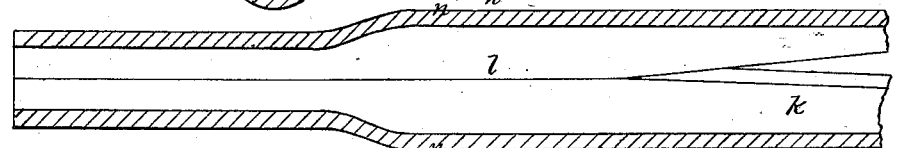
Witnesses.
E. H. Bates
Chas. B. Steele
Inventor.
Mildred Blakey
Chipman Fosmer & Co.
Attys.

UNITED STATES PATENT OFFICE.

MILDRED BLAKEY, OF ETNA, PENNSYLVANIA.

IMPROVEMENT IN MACHINES FOR MAKING WELDED TUBING.

Specification forming part of Letters Patent No. 148,406, dated March 10, 1874; application filed March 22, 1873.

CASE B.

*To all whom it may concern:*

Be it known that I, MILDRED BLAKEY, of Etna, in the county of Allegheny and State of Pennsylvania, have invented a new and valuable Improvement in the Manufacture of Welded Tubing; and I do hereby declare that the following is a full, clear, and exact description of the construction and operation of the same, reference being had to the annexed drawings, making a part of this specification, and to the letters and figures of reference marked thereon.

Figure 1:
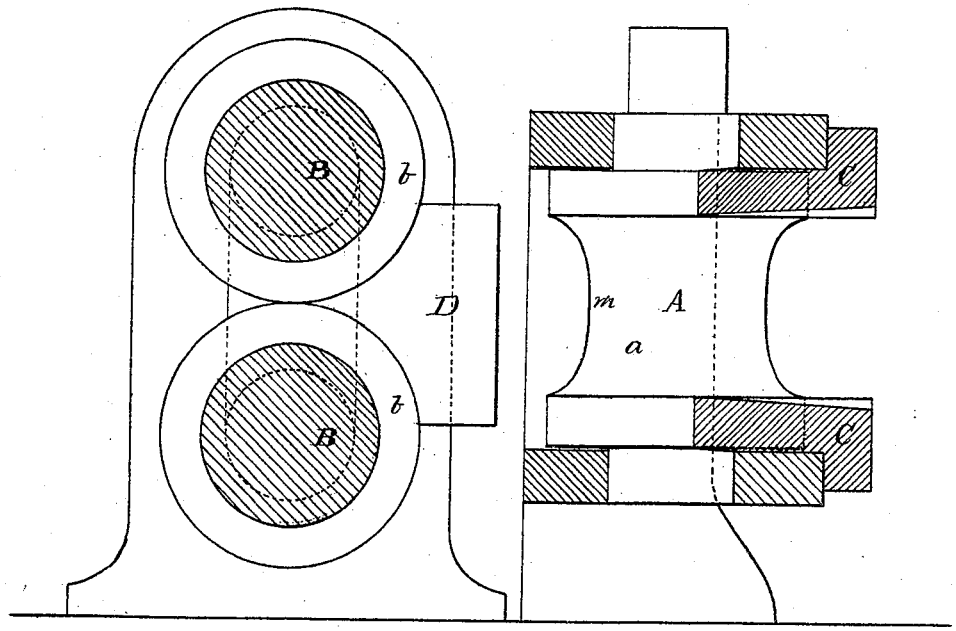
Figure 2:
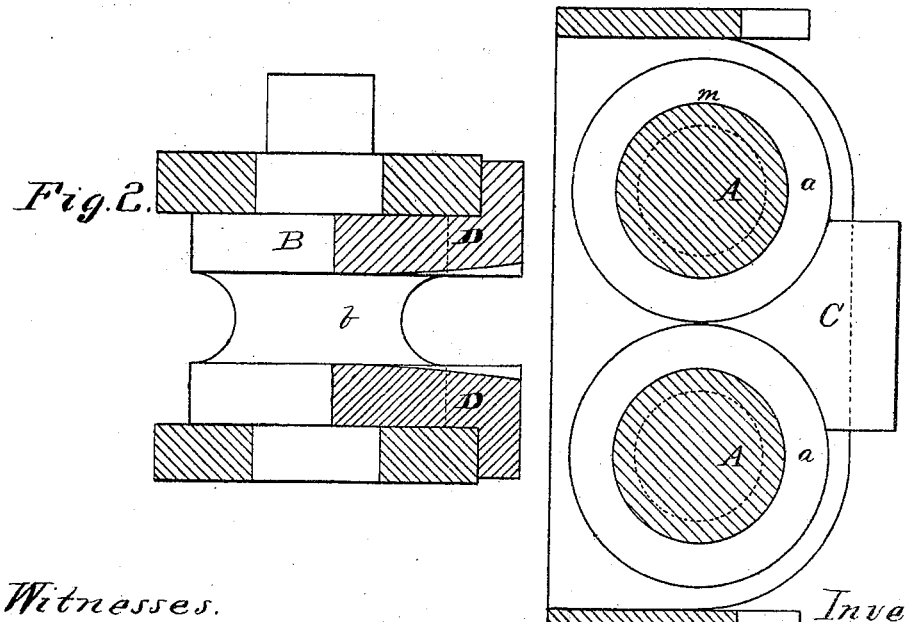

Figures 1 and 2 are sectional views of my invention. Fig. 3 is a front, and Fig. 4 a perspective, view of the same. Figs. 5, 6, 7, and 8 are detail views.

This invention has relation to the manufacture of welded tubing by rolling; and it consists in the combination and arrangement of entering and finishing rolls and a guide-block, as will be hereinafter more fully described.

The tendency of welded tubing to burst in the seam or weld is commonly known, and it is the object of this invention to compress the fibers of the metal with great force along the seam toward the weld as the same is being formed by the rolls. This is designed to be accomplished by the employment of entering-rolls, having flattened elliptical grooves, in connection with finishing-rolls, having the ordinary circular grooves, the diameter of the circle upon which the latter grooves are formed being about equal to or a little less than the conjugate diameter of the ellipse upon which the grooves of the entering-rolls are formed. The formation and arrangement of the rolls and their grooves are clearly illustrated in the drawings accompanying, in which—

The letters A A indicate the entering-rolls, and B B the finishing-rolls, the latter set of rolls being arranged in rear of the former set, and with their axes preferably at right angles to the axes of the entering set, or nearly so. The entering-rolls A are provided with the flattened elliptical grooves $a$, which form, at the place where they are adjacent to each other, an elliptical passage, $c$. The finishing-rolls B are provided with the ordinary circular grooves $b$, which form, at the place where they are adjacent to each other, the circular passage $d$, whose diameter is about equal to or a little less than the conjugate diameter $z z$ of the elliptical passage $c$. C D indicate concave guide-blocks, which serve to center the skelp and tube.

The operation is as follows, the object being the formation of the butt-weld, no core-piece or mandrel being required: The skelp, indicated at $k$, is introduced between the entering or flattening rolls A A, with its edges toward the middle portion or belly $m$ of one of the elliptical grooves, the middle portion of the skelp being, at the same time, turned toward the belly of the opposite elliptical groove. The rolls being rotated, the skelp is drawn between them and bent to the elliptical form indicated at $l$. The weld is partially formed between these rolls, the edges of the hot skelp being butted as it passes through. The effect of these elliptical grooves is to flatten the sides of the partially-formed tubing. The middle or back portion of the skelp is flattened, throwing the edges well out against the opposite groove. The seam side is flattened in order to bring as much of the metal as possible within vertical planes of pressure, extending upward and downward from the edges of the welding seam, as indicated by the lines $y y$ in Fig. 7. The flattened and partially-welded tube is carried forward by the action of the rolls A, between the guides D, to the rolls B, the small circular grooves of which seize the tube by its sides of smaller curvature $u u$, thereby grasping it firmly, and compress with great force the fibers of the flattened sides, condensing the metal thereof, and making an intimate weld of such strength that the tube will rather open in the unseamed portions of its wall than along the joint.

What I claim as new, and desire to secure by Letters Patent, is—

In the manufacture of welded tubing, the combination and arrangement of the entering-rolls A, having flattened elliptical grooves, the finishing-rolls B, having ordinary circular grooves, and the concave guide-block C D, substantially as specified.

In testimony that I claim the above I have hereunto subscribed my name in the presence of two witnesses.

MILDRED BLAKEY.

Witnesses:
D. D. KANE,
JOS. B. LOOMIS.